US006837015B2

(12) United States Patent
Terabe et al.

(10) Patent No.: US 6,837,015 B2
(45) Date of Patent: Jan. 4, 2005

(54) INSTALLATION METHOD OF FIREPROOF STRUCTURE FOR PROTECTING WATER PIPES

(75) Inventors: Yasunori Terabe, Yokohama (JP); Keita Inoue, Yokohama (JP); Yuji Nakagawa, Yokohama (JP); Kentaro Saeki, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 3 days.

(21) Appl. No.: 10/293,499

(22) Filed: Nov. 14, 2002

(65) Prior Publication Data

US 2003/0089072 A1 May 15, 2003

(30) Foreign Application Priority Data

Nov. 14, 2001 (JP) ...................................... 2001-348544

(51) Int. Cl.$^7$ ................................................ B01D 45/12

(52) U.S. Cl. ...................... 52/506.02; 52/2.22; 122/512

(58) Field of Search ......................... 52/506.02, 742.15, 52/742.16, 506.06, 2.22; 122/512

(56) References Cited

U.S. PATENT DOCUMENTS

| | | | | | |
|---|---|---|---|---|---|
| 2,703,559 | A | * | 3/1955 | Godshalk | 122/6 A |
| 4,367,867 | A | * | 1/1983 | Schnitzer et al. | 266/190 |
| 4,715,042 | A | * | 12/1987 | Heggart et al. | 373/74 |
| 4,904,286 | A | * | 2/1990 | Magol et al. | 55/434.4 |
| 5,290,016 | A | * | 3/1994 | Elsner | 266/193 |
| 5,423,294 | A | * | 6/1995 | Cole et al. | 122/512 |
| 5,513,835 | A | * | 5/1996 | Lonardi et al. | 266/176 |
| 5,557,901 | A | * | 9/1996 | Hoosic et al. | 52/506.03 |
| 6,487,980 | B2 | | 12/2002 | Wilhelmi et al. | |

FOREIGN PATENT DOCUMENTS

| | | | |
|---|---|---|---|
| DE | 4335707 | A1 | 4/1995 |
| DE | 10005426 | A1 | 8/2001 |
| EP | 0962696 | A1 | 12/1999 |
| EP | 0964205 | A2 | 12/1999 |
| EP | 1310731 | A1 | 5/2003 |
| FR | 2495284 | | 6/1982 |

* cited by examiner

*Primary Examiner*—Carl D. Friedman
*Assistant Examiner*—Basil Katcheves
(74) *Attorney, Agent, or Firm*—Wenderoth, Lind & Ponack, L.L.P.

(57) ABSTRACT

An installation for protecting water pipes is easily installed, even in areas of a water pipe wall where bends exist, can be inexpensively manufactured, and delivers stable longevity in high temperature environments. A refractory castable process embeds refractory castable 12 in concave areas between adjacent water pipes, at least in bend areas 24 where the pipes bend, to create an approximately flat surface on the water pipe wall 26 that faces the high temperature side. A refractory tile process installs approximately flat-shaped refractory tiles 13 over the surface of the embedded refractory castable 12. This refractory tile process for the refractory tile 13 includes a process to insert fastening members 15 previously installed on the foregoing water pipe 10 into a groove formed in the refractory tiles 13 to hold the tiles in place and a process to bind the refractory tiles 13 to the embedded refractory castable with an adhesive material.

7 Claims, 7 Drawing Sheets

INSTALLATION METHOD OF FIREPROOF STRUCTURE FOR PROTECTING WATER PIPES

BACKGROUND OF THE INVENTION

1 Field of the Invention

The present invention relates to a fireproof structure that protects the walls of water pipes installed in incinerators, boilers and the like for cooling and heat exchange from the high temperature gas environment therein. In particular, it relates to a protective fireproof structure and method of its installation which can be implemented on water pipe walls having curves or bends.

2. Description of the Related Art

Water pipes are installed inside of garbage incinerators, boilers and the like to cool the high temperature gas environment or perform heat exchange, and those water pipes have been protected from not only the high temperature gas environment, but the abrasion from flying ash and corrosion by the installation of fireproof tiles or fireproof castable structures around the incinerator/furnace walls.

Such walls of water pipes have been, for example, installed in stoker type incinerators 50 on the inside of the incinerator walls 56 as shown in FIG. 9. The stoker type incinerator 50 is comprised of trash inlet opening 51, grate 53, ash removal opening 54, air supply duct 55, and free board 52. Boiler water pipes are installed on incinerator wall 56 in order to recover the waste heat generated by burning.

As shown in FIG. 8, installed over the entire surface of the inner wall of the incinerator 56 is an array of boiler pipes 10, which comprise water pipe wall 26. That surface is covered by refractory tiles 25, refractory block, refractory castable or other fireproof material.

However, the combustion chambers of incinerators such as stoker type incinerators 50, or those in boilers and the like, have a number of openings such as air duct 55, an opening (manhole) for egress of maintenance workers to perform maintenance, and openings for the insertion of monitoring instruments such as a thermometer. The foregoing water pipes 10 must be installed to detour around such openings. Accordingly, there are a number of areas where water pipes 10 have a plurality of bends and lack a regularly arrayed structure, such as around a thermometer seat 24, manhole 22, monitoring instrument insertion openings, and air ducts.

In the prior art, a refractory castable or specially shaped refractory tiles were installed in these areas, around openings and the like, where the water pipes assumed a complex shape.

However, when installing fireproofing such as the foregoing refractory tiles, which have a fixed shape, costs would rise due to the need to manufacture several different types of refractory to conform to the bends around the individual openings. Further, due to the need for these individual, complexly shaped fireproofing materials, both their manufacture and installation were extremely difficult.

On the other hand, the refractory castable, being amorphous, can be easily installed on site. However, the precision with which it was installed was apt to vary depending upon the skill of each worker, and its longevity was inferior to that of the fixed-shape refractories, which were pressed and fired in a factory.

In particular, when incineration was performed in a higher temperature zone than commonly used incinerators, because it was necessary for the fireproof structure to protect the entire surface, including the area of pipe bends 21, from the high temperatures, fireproof bricks or the like were conventionally installed along the entire wall of the incinerator in the areas around the foregoing free board 52 and grate 53 and around the above described areas near openings where the water pipes were bent. This resulted in increasing the surface area where the fireproof structure exhibited a complex shape, and it made the foregoing refractory tiles very costly. Further, since the longevity of the foregoing refractory castable is unstable, there was a high probability that the water pipes would become exposed and damaged.

SUMMARY OF THE INVENTION

The present invention was developed to address the problems of the prior art. The objectives of this invention are to provide a fireproof structure and installation method for protecting water pipes that delivers stable longevity in high temperature environments, that is easily installed, even in areas of the water pipe wall where bends exist, and that can be inexpensively manufactured.

At this point, to resolve these problems, this invention discloses an installation method for a fireproof structure to protect water pipes which protects water pipe walls installed in the bend areas in incinerators, boilers and the like from the high temperature environment. A refractory castable process embeds refractory castable in a concave area between adjacent water pipes, at least in the areas where the pipes bend, to create an approximately flat surface on the water pipe wall that faces the high temperature side. A refractory tile process installs approximately flat-shaped refractory tiles over the surface of the embedded refractory castable.

This invention, by first flattening the surface with refractory castable, even in areas where the water pipes are bent and assume a complex shape such as around the air ducts, manholes for worker egress, insertion openings for monitoring instruments and a clinker chill area, etc., eliminates the need to manufacture a plurality of types of refractory tiles, thereby serving to reduce manufacturing costs and provide a simple surface over which the refractory tiles can be easily installed.

Further, since the fireproof structure is a double-layered structure comprised of castable refractory material and refractory tiles, even if any of the refractory tiles should fall off, the water pipes remain protected by the foregoing refractory castable, thereby preventing the pipes from being suddenly exposed.

Also, another preferred embodiment of the invention is characterized by a configuration wherein the process to install the flat-shaped refractory tiles includes a process to insert fastening members previously installed on the foregoing water pipe wall into a groove formed in the refractory tiles to hold the tiles in place. A further process binds the refractory tiles to the embedded refractory castable with an adhesive material.

In this manner, having the fastening members for the foregoing refractory tiles directly projecting from the foregoing water pipes enhances the cooling effect upon the fastening members to prevent damage by the high temperature gases and to prevent the foregoing refractory tiles from falling off. Mortar or the like would be suitable for use as the aforementioned adhesive.

Further, another preferred embodiment of the invention is characterized by a configuration wherein the refractory castable is installed in a manner such that the ratio between the radius of the foregoing water pipes and the thickness of the refractory castable falls within the range of approximately 1:1 to 1.5.

Thus, if this ratio between the radius of the foregoing water pipes and the thickness of the refractory castable is set to approximately 1:α, where the value of α would range from approximately 1 to 1.5, preferably approximately 1 to 1.3, it is possible, after the installation of the foregoing refractory castable, to assure that the surface of the resulting fireproof structure is flat. The appropriate setting of the value of α, further assures that in the unusual case where a refractory tile would fall off, the underlying refractory castable would protect the water pipes from becoming exposed to thereby assure their protection.

Further still, another preferred embodiment of the invention is characterized by a configuration wherein the fireproof structure is installed upon water pipe walls in stoker type incinerators where the gas retention time is 2 seconds or more from the secondary air duct and the incinerator outlet temperature to an upper limit of the fireproof installation reaches about 900° C. to 1200° C.

In such high temperature furnaces such as incinerators, the need arises to install water pipes over the entire inside surface of the furnace to provide for cooling the furnace wall. In the past, longevity was poor when refractory castable as the sole fireproofing structure was subjected to the high temperature gases. Thus, by applying the inventions described above to stoker type incinerators, it is easy to install a fireproof structure over the entire inside surface of the furnace and to improve that structures longevity.

Further, according to another preferred embodiment, the refractory castable process further includes, prior to the installation process for the refractory castable, a drain process to form water drain-holes in the fins that join adjacent runs of the water pipes and drain the water from said water drain-holes after the refractory tile process. This configuration makes it possible to easily drain the water from the surface of the foregoing refractory castable even after the refractory tiles have been installed.

Further, other preferred embodiments of this invention are inventions of fireproof structures for protecting water pipes that deliver effects similar to the installation method described above. A preferred embodiment of the invention is a fireproof structure to protect water pipes which protects water pipe walls installed in the bend areas in incinerators, boilers and the like from the high temperature environment, and comprises a refractory castable embedded in a concave area between adjacent water pipes, at least in the areas where the pipes bend, to create an approximately flat surface, and a flat refractory tile installed over the surface of the refractory castable.

Further, another preferred embodiment of the invention is characterized by the configuration wherein the refractory tile is held in place by engaging the fasting member previously installed on the foregoing water pipe wall with a groove formed in the refractory tile and binding the refractory tile to the refractory castable by an adhesive.

Also, it is preferable to set the ratio between the foregoing radius of the water pipes and thickness of refractory castable to approximately 1:1 to 1:1.5. Further, the foregoing fireproof structure is optimally installed upon water pipe walls in stoker type incinerators, where the gas retention time is 2 or more from the secondary air duct, and the incinerator outlet temperatures to an upper limit of fireproof installation reach about 900° C. to 1200° C.

DETAILED DESCRIPTION OF THE PREFERRED EMBODIMENTS

In this section we shall explain several preferred embodiments of this invention with reference to the appended drawings. Whenever the size, materials, shapes, relative positions and other aspects of the parts described in the embodiments are not clearly defined, the scope of the invention is not limited only to the parts shown, which are meant merely for the purpose of illustration.

Figure 1B:
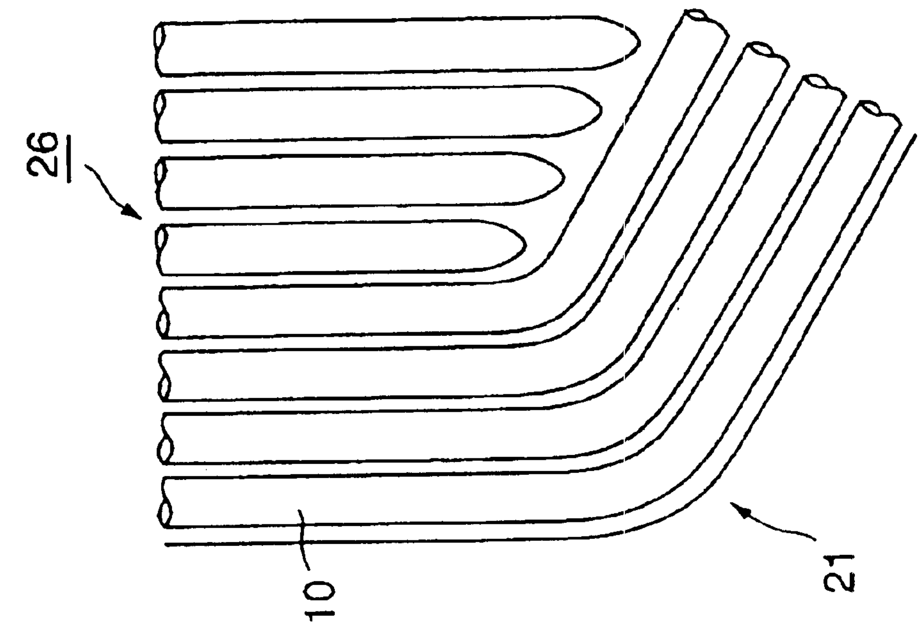
FIG. 1(*a*) shows a cut-away perspective view of a first embodiment of this invention's fireproof structure for protecting water pipes, which is installed in an area where the pipes bend, and FIG. 1(*b*) is a diagram of the bend area in the water pipe wall.
Figure 1A:
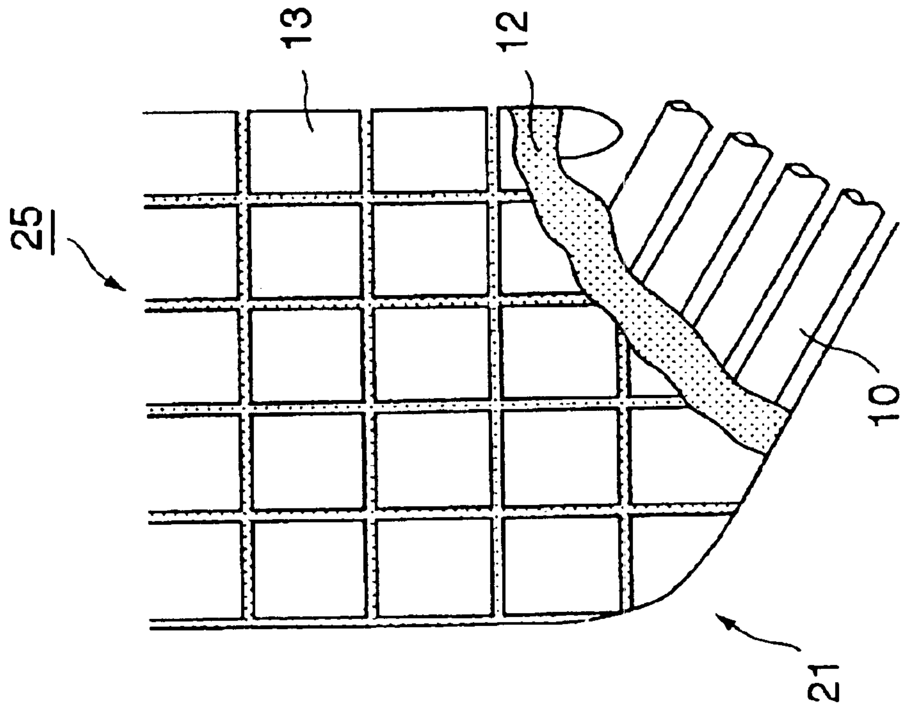
Figure 2A:
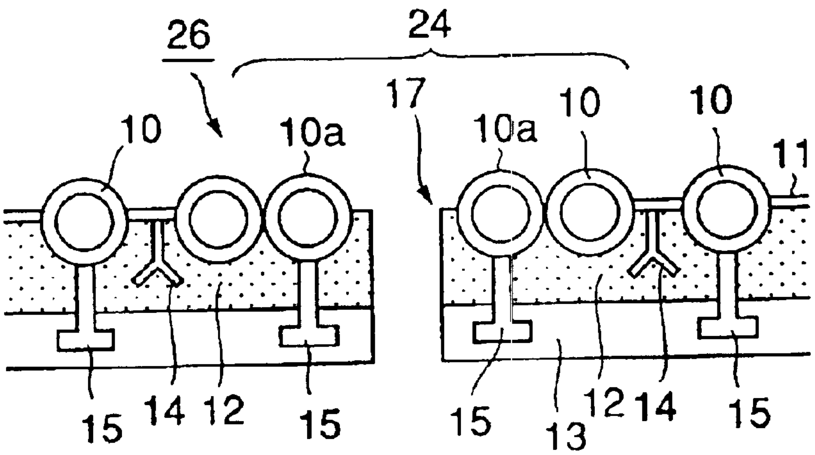
FIG. 2(*a*) is a sectional view of a second embodiment of this invention showing fireproof structure for protecting water pipes at a thermometer seat, and FIG. 2(*b*) is a diagram of the thermometer opening.
Figure 2B:
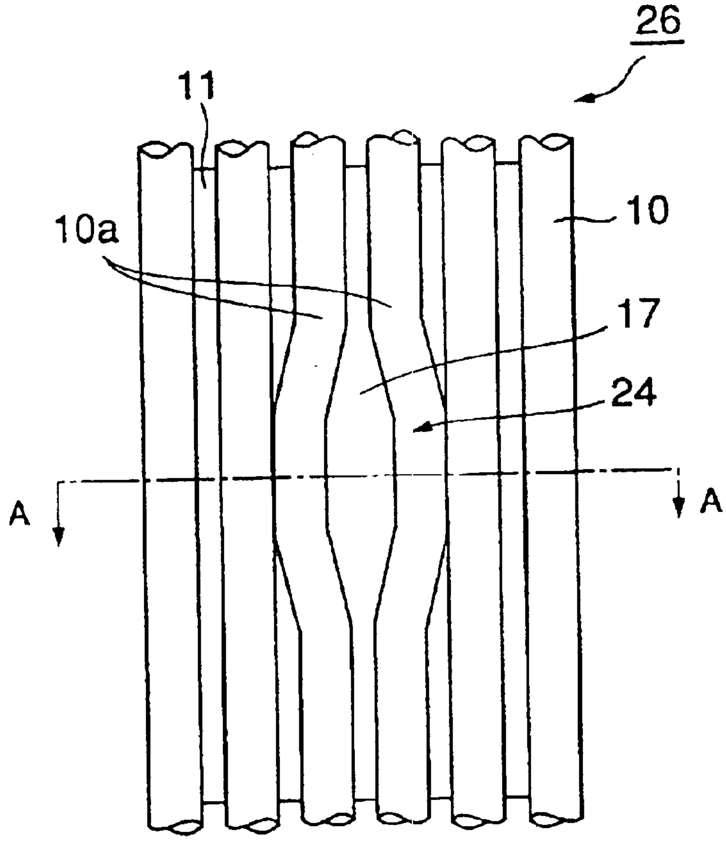
Figure 3A:
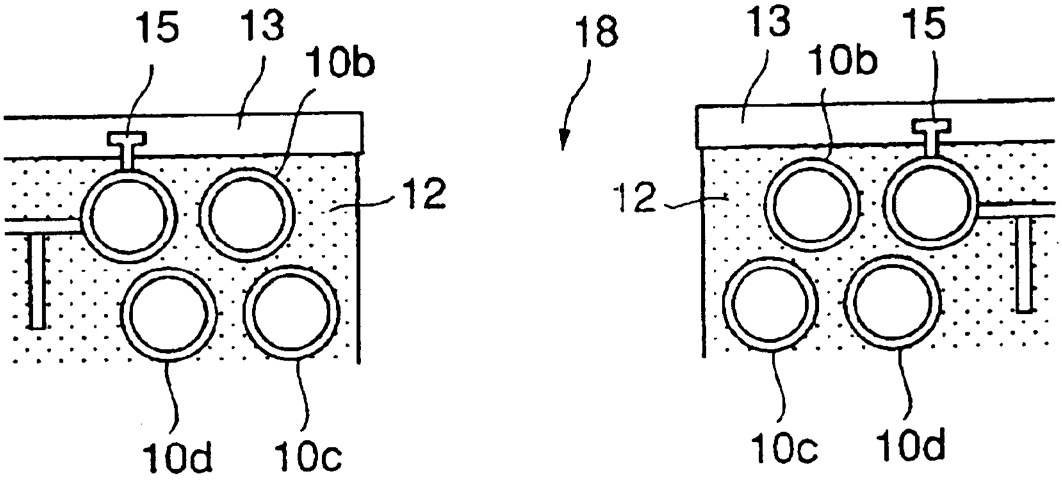
FIG. 3(*a*) is a sectional view of a third embodiment of this invention's fireproof structure for protecting water pipes around a manhole area and FIG. 3(*b*) is a diagram of the manhole.
Figure 3B:
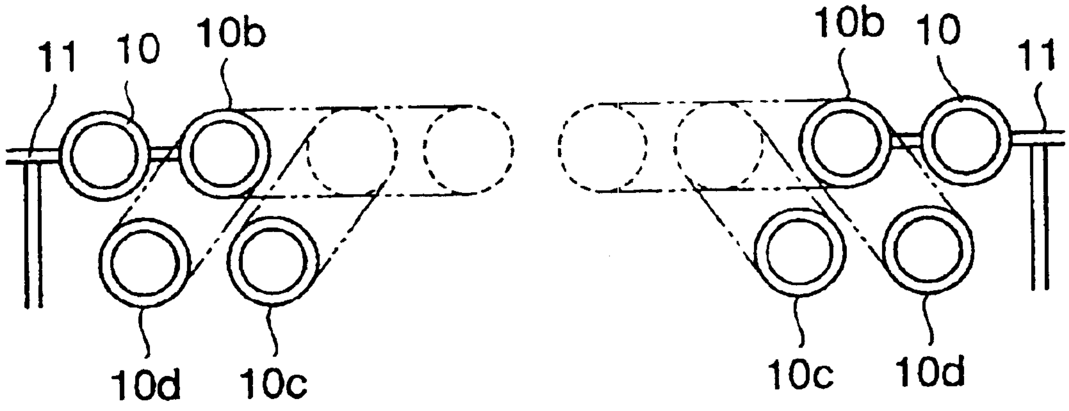
Figure 4:
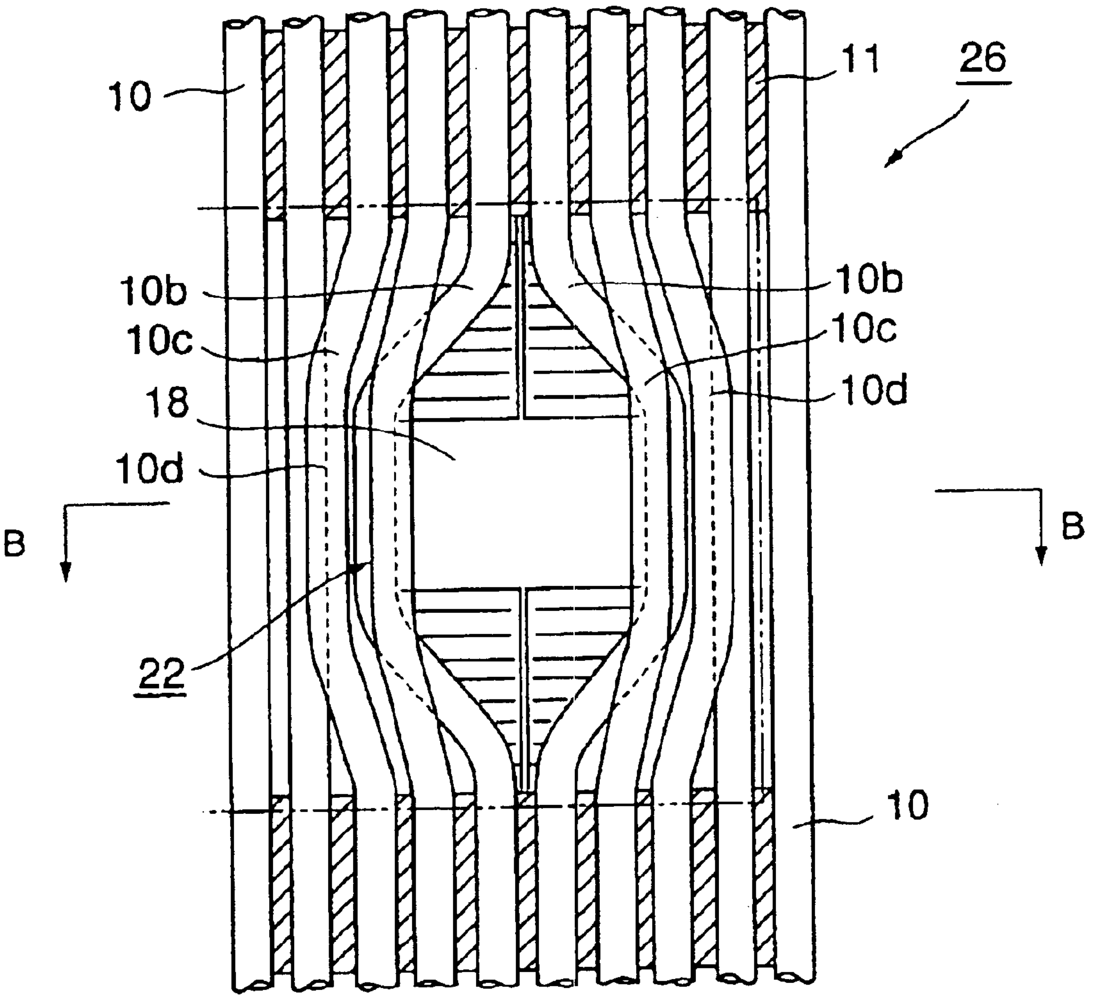
FIG. 4 is a diagram of the structure of the water pipe protective structure around the manhole of a stoker type incinerator.

FIG. 1(*a*) shows a cut-away perspective view of a first embodiment of this invention's fireproof structure for protecting water pipes, which is installed in an area where the pipes bend, and FIG. 1(*b*), is a diagram of the bend area in the water pipe wall. FIG. 2(*a*) is a sectional view of a second embodiment of this invention's fireproof structure for protecting water pipes at the thermometer seat, and FIG. 2(*b*), a diagram of the thermometer opening. FIG. 3(*a*) is a sectional view of a third embodiment of this invention's fireproof structure for protecting water pipes around the manhole area, and FIG. 3(*b*) is a diagram of the manhole. FIG. 4 is a diagram of the structure of the water pipe protective structure around the manhole of a stoker type incinerator.

As an example for the present embodiments, the water pipe walls to which the fireproof structure is installed are in a stoker type incinerator. Such stoker type incinerators are high temperature furnaces having outlet temperatures of about 900° C. to 1200° C.

Figure 8:
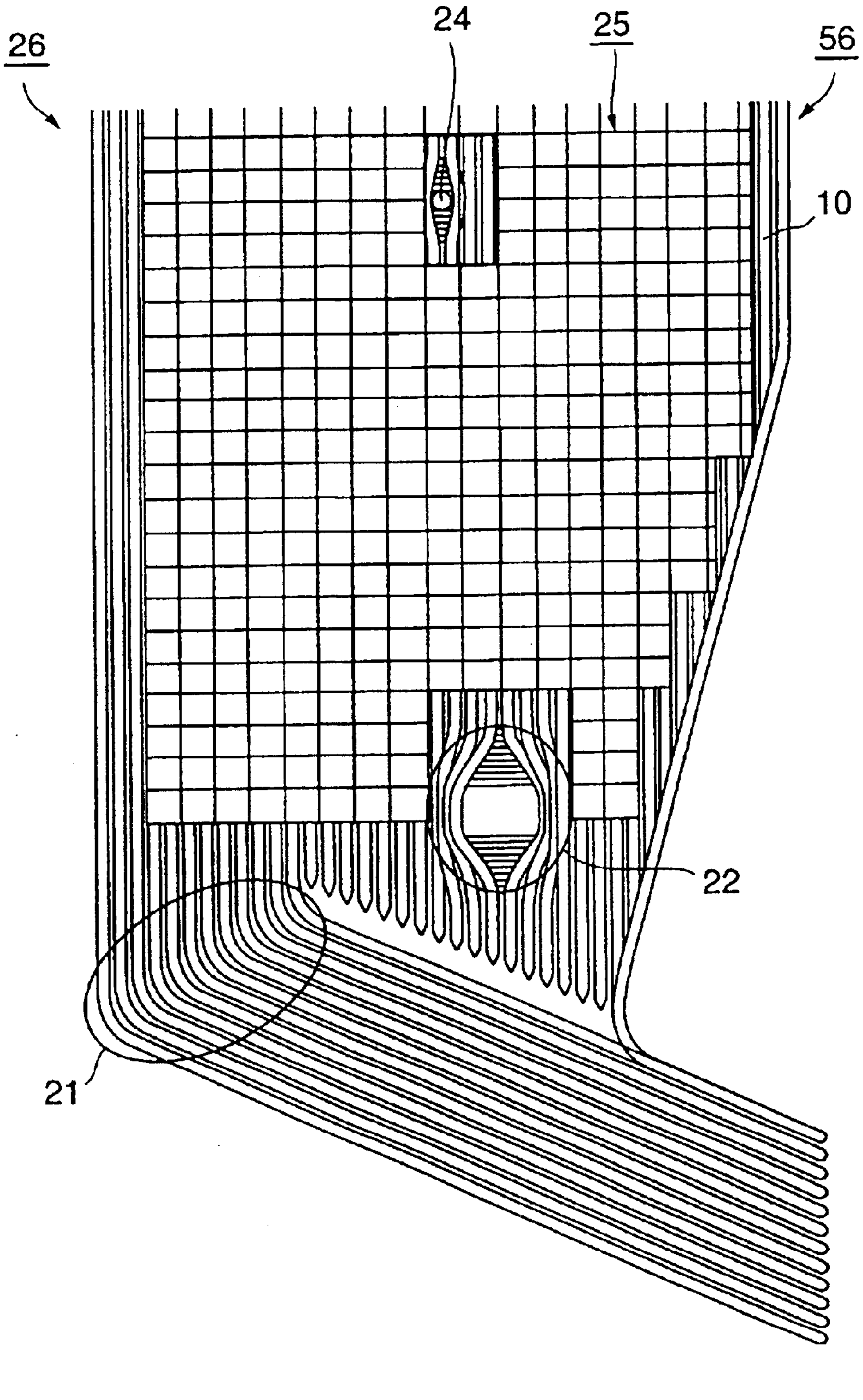
FIG. 8 is a diagram of a water pipe wall of a stoker type incinerator.
Figure 9:
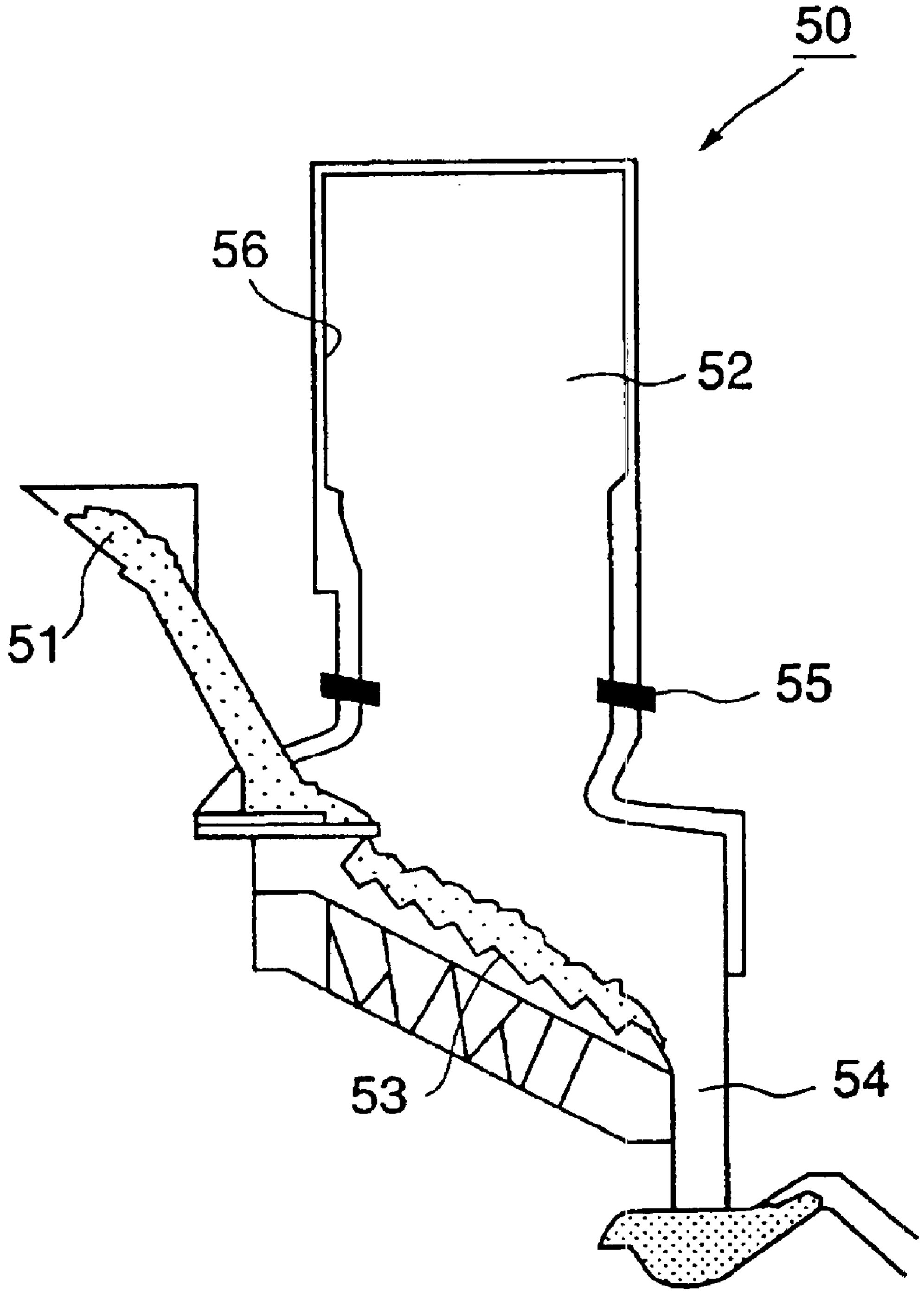
FIG. 9 is an overall sketch of a stoker type incinerator.

The water pipe wall depicted in FIGS. 1 through 4 show the areas of the water pipes where bends occur, as shown in FIG. 8, which was previously introduced to describe the prior art. FIG. 1 shows bend area 21 located in the bottom of the incinerator, FIG. 2 the area where an opening exists, such as an opening for thermometer installation, and FIGS. 3 and 4 show the area of manhole 22, which is used for worker egress.

In FIGS. 1, 10 represents the water pipe forming the flow path for the coolant. Fins 11 (see FIG. 5) connect adjacent water pipes 10 either in the horizontal or vertical direction to compose a water pipe wall. 12 represents the refractory castable, which is an amorphous fireproof material primarily composed of SiC. 13 represents refractory tiles which are similarly comprised of SiC; the refractory castable 12 and refractory tiles 13 make up fireproof structure 25.

There are no special limitations upon the use of materials in addition to SiC in the refractory tiles and refractory castable. Materials such as $Si_3N_4$ or others that improve longevity or corrosion resistance also may be included.

The foregoing bend area 21 runs from the wall of the free board area to the grate area of the furnace wall, and since it is located in a high temperature area of about 800°πC. in this high temperature stoker type incinerator, it is necessary to install water pipes 10, as shown in FIG. 1(*b*), and further, to protect the water pipes 10 by covering them with a fireproof structure such as shown in FIG. 1(*a*).

In the present embodiment, after first spraying refractory castable 12 into the concave areas in the foregoing water pipe wall 26 to produce a flat surface, the entire surface is covered by the foregoing refractory tiles 13, which are held in place by an adhesive such as mortar. The refractory castable 12 and the refractory tiles 13 are held by retainers or fastening members to prevent them from easily falling off.

In this process, there are no particular restrictions upon the installation method for the foregoing refractory castable 12. It may either be sprayed around the outside circumferential surfaces of the foregoing water pipes 10 and allowed to harden, or a mold may be placed opposite water pipes 10, the space filled with the castable, and the mold removed after the castable cures. The foregoing refractory tiles 13 are preferably manufactured in a factory by molding, pressing, and firing materials primarily comprised of SiC, and the preformed refractory tiles 13 are then installed on the foregoing pipe wall 26.

Because the foregoing refractory castable 12 renders a flat installation surface for refractory tile 13, it was possible to use flat shaped refractory tiles 13 to make a clean installation without having to resort to using a number of different types of refractory tiles to accommodate complex shapes. As a result, not only is it possible to reduce manufacturing costs, but it is also possible to more easily install the fireproof structure. Further, as described above, due to the double-layered fireproof structure comprised of refractory castable 12 and refractory tiles 13, even in the event of any of the foregoing refractory tiles 13 falling off, the foregoing refractory castable 12 would still provide sure protection of the water pipes and prevent the pipes from becoming exposed.

FIG. 2 shows a second embodiment of this invention's fireproof structure installed around a thermometer seat 24, which includes thermometer opening 17. As shown in FIG. 2(*b*), said thermometer seat 24 is adjacent to two parallel water pipes 10*a* on either side which bend to form an open area where the thermometer opening 17 is located. FIG. 2(*a*) is a sectional view taken along line A—A of FIG. 2(*b*). At the center of the gap between water pipe walls 26 lies the foregoing thermometer installation opening 17, and there are bends in water pipes 10*a* on either side to accommodate it. Thus, the water pipes 10*a,* around the thermometer seat 24, form an irregular pipe wall array.

Refractory castable 12 is installed on the high temperature gas side, in other words, the side facing the inside of the furnace, of the foregoing water pipe wall 26 at least to the extent where the grooves formed between the water pipe wall are completely filled in to create a flat surface. In addition, flat refractory tiles 13 are installed with an adhesive such as mortar over the surface of refractory castable 12.

In addition, the foregoing water pipes 10 have L-shaped hooks 15 which protrude toward the inside of the furnace. The foregoing refractory tiles 13 are structured to engage thereon. In addition, adjacent water pipes 10 are linked by fins 11, which have protruding Y-shaped anchors 14 that serve as retainers to hold the foregoing refractory castable 12 in place.

Thus, studding with fastening members that engage the refractory tiles with the foregoing water pipes 10 improves the cooling effect for the fastening members, prevents the fastening members from becoming damaged by the high temperatures, and increases their longevity. This makes it possible to prevent the foregoing refractory tiles 13 from falling off.

The fastening members and retainers for the foregoing refractory tiles 13 and refractory castable 12 are best made from materials having thermal expansion rates that differ little from that of water pipes 10. Their shapes need not be confined to the above described L-shaped hooks 15 or Y-shaped retainers 14 so long as they serve the same purpose.

FIG. 3 are sectional views taken along line B—B of FIG. 4. They show a third embodiment of a fireproof structure according to this invention. FIG. 4 shows a fireproof structure installed around manhole 22, which allows workers to enter and exit for maintenance and the like.

This manhole area 22, as an example shown in FIGS. 3(*a*) and 4, has a total of 6 water pipes 10, 3 on each side, which bend to form a manhole 18. Among the foregoing 6 water pipes, the two in the center 10*b,* 10*b* are bent and overlay adjacent water pipes 10*c,* 10*d,* and further, water pipes 10*c* and 10D are bent toward the outside of the incinerator to avoid interference with the foregoing pipes 10*b*. Thus, in the area of manhole 22, water pipes 10 have complex bends that form a three dimensional structure.

As is shown in FIG. 3(*a*) for this third embodiment, first refractory castable 12 is used to fill the gaps between water pipes 10, 10*b,* 10*c,* and 10*d* to create a flat surface that faces the inside of the incinerator, and then flat refractory tiles 13 are installed with mortar. Further, the structure includes L-shaped hooks 15, studded around water pipes 10 and protruding toward the inside of the incinerator, which engage L-shaped grooves formed in the foregoing refractory tiles 13 to hold the tiles in place.

This type of structure makes it possible to install a fireproof structure that completely protects water pipe walls having a complex shape by using just one or a few types of refractory tiles.

Figure 5:
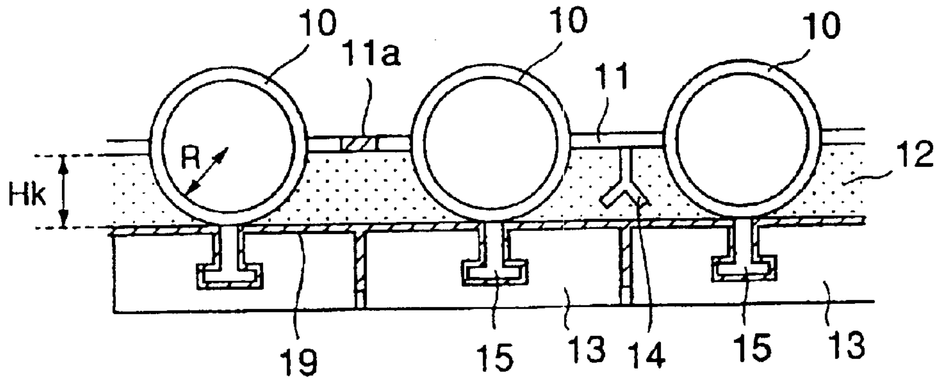
FIG. 5 is a cross sectional drawing of a double-layered structure according to another preferred embodiment.
Figure 6:
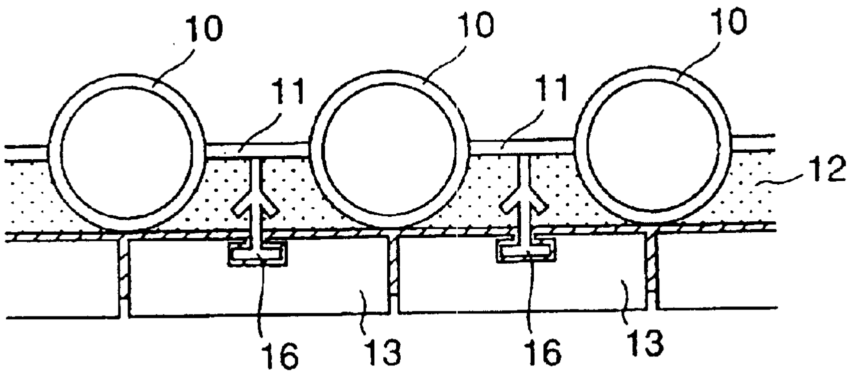
FIG. 6 is a cross sectional drawing of double-layered structure according to another preferred embodiment.
Figure 7:
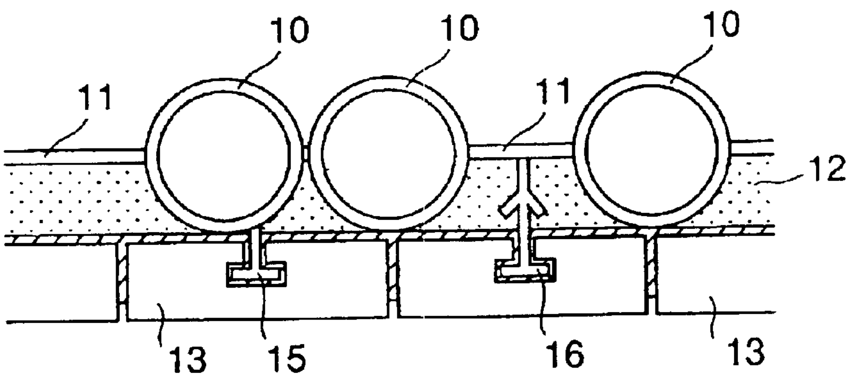
FIG. 7 is a cross sectional drawing of double-layered structure according to another preferred embodiment.

FIGS. 5 through 7 show sectional views of fastening and support structures for the foregoing refractory tiles and refractory castables. FIG. 5 shows a fireproof structure that employs L-shaped hooks 15 and Y-shaped anchors similar to those of FIG. 2. In this embodiment, the foregoing water pipes 10 have one protruding L-shaped hook 15 for each refractory tile 13, but other structures, having more or fewer hooks, may be used depending upon the weight and surface area of the tiles. Also, the foregoing refractory tiles, in addition to being retained by the foregoing hooks 15, are also held to the water pipe wall with adhesive mortar 19.

Further, the fireproof structure is installed to produce a ratio of thickness of the foregoing refractory castable $H_k$ to the radius R of the water pipe 10 to be $H_k$: R=1:1 to α:1, wherein the value of α is approximately 1 to 1.5, preferably about 1 to 1.3. So doing assures a flat, fireproof structural surface after installing the foregoing refractory castable. Further, by appropriately selecting the value of α, it is possible assuredly protect water pipes 10 from exposure, even in the unlikely event of any of the refractory tiles 12 falling off.

Prior to installing the aforementioned fireproof structure, holes 11*a* are formed in fins 11 that join the foregoing water pipes 10 to each other. Then, following the installation of the foregoing refractory castable 12 and refractory tiles 13, water may be drained through holes 11*a*, and subsequently plugged by welding, etc. This makes it possible to easily drain the water from the surface of the foregoing refractory castable 12, even after refractory tiles 13 have been installed. It is also possible to form the foregoing holes 11*a* on the refractory tile 13 side, and then plug them with mortar after draining the water.

FIG. 6 shows a fireproof structure that employs a combination anchor and hook 16 which retains both the foregoing refractory castable 12 and refractory tiles 13 in place. So doing eliminates the need to separately manufacture anchors and hooks, and it eases the installation process.

FIG. 7 shows a fireproof structure that employs the foregoing L-shaped hooks 15 and the foregoing combination anchors and hooks 16. These can be used selectively, depending upon the layout of the foregoing water pipes 10, to retain the fireproof structures, to thereby ease the installation on water pipe walls having a complex shape.

As described above, this invention, by employing refractory castable to fill at least the concave areas in the water pipe wall to create a flat surface for the overlay of the refractory tiles, makes it possible to use flat refractory tiles to thereby obviate the need to manufacture multiple types of the refractory tiles to conform to the areas where the water pipes assume a complex shape, and to facilitate their installation. Further, since it is possible to install the fireproof structure over the complete surface of the water pipe wall using one or only a few types of refractory tiles, it is less costly to manufacture the refractory tiles and easier to install the fireproof structure.

Also, since the fireproof structure is a double-layered structure comprised of refractory castable and refractory tiles, even in the event that any of the foregoing refractory tiles fall off inside the high temperature gas environment, the underlying water pipes will remain protected by the foregoing refractory castable, which assures that the water pipes will not become exposed.

Further, since the foregoing water pipes are studded with the fastening members for the foregoing refractory tiles, improved cooling effects are delivered to the fastening members, which prevents them from becoming damaged and allowing the refractory tiles to fall off.

Further still, through the appropriate use of L-shaped hooks, Y-shaped anchors, and combination hooks and anchors, it is possible to easily install refractory on complex structures such as the bends in the water pipe wall around openings, as well as to install fireproof structures in a wide variety of areas.

What is claimed is:

1. A method of forming a fireproof structure for protecting water pipes of a water pipe wall in a combustion chamber against a high temperature atmosphere in the combustion chamber, wherein the water pipe wall has at least one bent part where the pipes are bent such that the water pipes are not arranged in a regular array, said method comprising:

filling concavities between adjacent water pipes with refractory castable in the at least one bent part of the water pipe wall where the water pipes are not arranged in a regular array so that the water pipes are embedded in the refractory castable and so that a high temperature atmosphere side wall surface of the water pipe wall at the at least one bent part is formed into an approximately flat surface; and installing approximately flat-shaped refractory tiles over the surface of the refractory castable, said installing including engaging fastening members that are attached to the water pipes with grooves in the refractory tiles and gluing the refractory tiles to the approximately flat surface of the refractory castable with an adhesive agent by spraying the adhesive agent on the refractory castable.

2. The method of claim 1, wherein said filling comprises applying the refractory castable to the water pipes so that the ratio of the thickness of the refractory castable to the radius of the water pipes falls in a range of approximately 1 to 1.5.

3. The method of claim 1, wherein the combustion chamber is in a stoker type incinerator having a retention time of secondary air of 2 seconds or more and combustion gas temperature at an outlet of the incinerator reaches about 900° C. to 1200° C.

4. The method of claim 1, further comprising draining water from water drain holes formed in fins connecting the adjacent water pipes after said filling.

5. A fireproof structure for protecting water pipes of a water pipe wall formed in a combustion chamber against a high temperature in the combustion chamber, the water pipe wall having at least one bent part where the water pipes are bent such that the water pipes are not arranged in a regular array, comprising:

a refractory castable filled in concavities between adjacent water pipes at least in the at least one bent part where the water pipes are not arranged in a regular array such that the water pipes are embedded in the refractory castable and a high temperature atmosphere side wall of the water pipe wall at the at least one bent part is formed into an approximately flat surface; and flat-shaped refractory tiles installed over the approximately flat surface of the refractory castable, wherein fastening members attached to the water pipes are engaged in grooves formed in the refractory tiles and the refractory tiles are glued to the approximately flat surface by an adhesive agent that has been sprayed onto the approximately flat surface.

6. The structure of claim 5, wherein a ratio of the thickness of the refractory castable to the radius of the water pipes falls in a range of approximately 1 to 1.5.

7. The structure of claim 5, wherein the combustion chamber is part of a stoker type incinerator in which a retention time of secondary air is 2 seconds or more and combustion gas temperature at an outlet of the incinerator reaches about 900° C. to 1200° C.

* * * * *